(12) United States Patent
Conrad et al.

(10) Patent No.: US 10,927,645 B2
(45) Date of Patent: Feb. 23, 2021

(54) HEATER CABLE WITH INJECTABLE FIBER OPTICS

(71) Applicant: Baker Hughes, LLC, Houston, TX (US)

(72) Inventors: Caleb Marchant Conrad, Anchorage, AK (US); Carl Stoesz, Blacksburg, VA (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 269 days.

(21) Appl. No.: 16/105,962

(22) Filed: Aug. 20, 2018

(65) Prior Publication Data

US 2020/0056453 A1    Feb. 20, 2020

(51) Int. Cl.
| | | |
|---|---|---|
| E21B 36/04 | (2006.01) | |
| G02B 6/50 | (2006.01) | |
| H05B 3/56 | (2006.01) | |
| E21B 47/00 | (2012.01) | |
| E21B 43/12 | (2006.01) | |
| E21B 19/00 | (2006.01) | |

(52) U.S. Cl.
CPC ............ *E21B 36/04* (2013.01); *E21B 19/00* (2013.01); *E21B 43/121* (2013.01); *E21B 47/00* (2013.01); *G02B 6/50* (2013.01); *H05B 3/56* (2013.01)

(58) Field of Classification Search
CPC ...... E21B 36/04; E21B 43/2401; E21B 17/20; E21B 17/206; E21B 23/14; E21B 23/08; E21B 33/072
See application file for complete search history.

(56) References Cited

U.S. PATENT DOCUMENTS

| | | | |
|---|---|---|---|
| 5,782,301 A | 7/1998 | Neuroth et al. | |
| 6,497,279 B1 | 12/2002 | Williams et al. | |
| 7,040,390 B2 | 5/2006 | Tubel et al. | |
| 7,140,435 B2 | 11/2006 | Defretin et al. | |
| 7,322,421 B2 * | 1/2008 | Blacklaw ............ | G02B 6/4464 166/383 |
| 7,570,858 B2 | 8/2009 | Coronado | |

(Continued)

FOREIGN PATENT DOCUMENTS

WO    2006116078 A1    11/2006

OTHER PUBLICATIONS

International Search Report and Written Opinion issued in connection with corresponding PCT Application No. PCT/US2019/047068 dated Feb. 14, 2020.

*Primary Examiner* — Shane Bomar
(74) *Attorney, Agent, or Firm* — Crowe & Dunlevy, P.O.

(57) ABSTRACT

A method for deploying a fiber optic line from a surface to a desired location in a wellbore includes the steps of identifying a heater cable deployed in the wellbore, where the heater cable includes one or more conductors and a first capillary tube. The method continues with the step of loading a terminal end of the fiber optic line into the first capillary tube from the surface. Next, the method includes the step of pumping a working fluid into the first capillary tube from the surface to inject the fiber optic line through a portion of the first capillary tube. The method concludes with the step of stopping the injection of the fiber optic line when the terminal end of the fiber optic line reaches the desired location in the wellbore.

20 Claims, 4 Drawing Sheets

(56) References Cited

U.S. PATENT DOCUMENTS

| | | | |
|---|---|---|---|
| 7,708,078 B2* | 5/2010 | Stoesz | E21B 23/14 166/378 |
| 7,730,936 B2* | 6/2010 | Hernandez-Solis | E21B 36/04 166/60 |
| 7,731,421 B2* | 6/2010 | Hadley | E21B 47/047 374/136 |
| 7,740,064 B2 | 6/2010 | McCoy et al. | |
| 8,630,816 B2* | 1/2014 | Park | G01F 23/292 702/134 |
| 8,708,664 B2 | 4/2014 | Brookbank | |
| 9,255,836 B2 | 2/2016 | Taverner et al. | |
| 2003/0122535 A1 | 6/2003 | Williams et al. | |
| 2004/0112596 A1* | 6/2004 | Williams | E21B 47/135 166/250.03 |
| 2005/0034873 A1* | 2/2005 | Coon | E21B 47/135 166/380 |
| 2006/0086508 A1 | 4/2006 | Coon et al. | |
| 2007/0110355 A1 | 5/2007 | Jaaskelainen et al. | |
| 2007/0158064 A1* | 7/2007 | Pribnow | G01F 1/6884 166/250.01 |
| 2008/0273852 A1* | 11/2008 | Parker | G01J 5/0821 385/128 |
| 2008/0317095 A1* | 12/2008 | Hadley | E21B 47/047 374/137 |
| 2009/0033331 A1* | 2/2009 | Stoesz | G02B 6/50 324/323 |
| 2010/0025048 A1 | 2/2010 | Franzen et al. | |
| 2011/0044574 A1* | 2/2011 | Strong | E21B 47/06 385/12 |
| 2011/0079401 A1* | 4/2011 | Gambier | E21B 23/14 166/384 |
| 2014/0290335 A1 | 10/2014 | Shanks | |
| 2017/0123103 A1 | 5/2017 | Tsakalakos et al. | |
| 2017/0298718 A1* | 10/2017 | Mills | E21B 43/2401 |
| 2019/0264519 A1* | 8/2019 | Ross | E21B 43/08 |

* cited by examiner

HEATER CABLE WITH INJECTABLE FIBER OPTICS

FIELD OF THE INVENTION

This invention relates generally to the field of downhole pumping systems, and more particularly, but not by way of limitation, to a heater cable configured for the in-situ injection and withdrawal of fiber optic lines.

BACKGROUND

Oil and gas production often occurs in remote, inhospitable locations. The production of petroleum products in cold climates introduces additional challenges because the lower temperatures may increase the viscosity of production fluids. In cold climates or where the wellbore fluids are particularly viscous, heater cables have been used to increase the temperature in the wellbore to decrease the viscosity of the wellbore fluids. This generally enhances the passage of fluids from the reservoir into the wellbore and improves the operation of the downhole pumping equipment. The use of heater cables also assists in the prevention of paraffin formation in the wellbore.

Heater cables are typically electrically resistive components and are often configured as three-phase devices in which three conductors receive power from equipment located on the surface. The conductors are typically each wrapped with one or more polymeric insulation layers and encased within lead sheaths. The lead sheaths are then wrapped with impermeable liners and protected with an exterior armor. The lead encasement and armor facilitate heat transfer between the conductors and the wellbore adjacent the armor. In some cases, the heater cable is banded to the production tubing and installed during the completion of the well.

Modern heater cables may also include sensors for observing and reporting conditions in the downhole environment. Hot wire anemometers have been used in connection with heater cables to evaluate fluid flow adjacent the heater cable. In other cases, fiber optic cables have been used in connection with heater cables to perform temperature and flow measurement functions at various intervals along the heater cable. The use of fiber optic cables in connection with a heater cable is disclosed in U.S. Pat. No. 6,497,279, the entire disclosure of which is herein incorporated by reference.

Although the use of fiber optic sensors in connection with heater cables has proven useful, fiber optic lines are expensive and the increased cost of heater cables with integrated fiber optic lines may be cost prohibitive, particularly for applications in which the sensor function of the fiber optic lines is only needed on a periodic or intermittent basis. There is, therefore, a need for an improved heater cable that provides a more cost-effective use of fiber optic cables. It is to this and other deficiencies in the prior art that the present invention is directed.

SUMMARY OF THE INVENTION

In one aspect, the present invention includes a method for deploying a fiber optic line from a surface to a desired location in a wellbore. The method includes the steps of identifying a heater cable deployed in the wellbore, where the heater cable includes one or more conductors and a first capillary tube. The method continues with the step of loading a terminal end of the fiber optic line into the first capillary tube from the surface. Next, the method includes the step of pumping a working fluid into the first capillary tube from the surface to inject the fiber optic line through a portion of the first capillary tube. The method concludes with the step of stopping the injection of the fiber optic line when the terminal end of the fiber optic line reaches the desired location in the wellbore.

In another aspect, the present invention includes a heater cable for use in a wellbore drilled from a surface to a geologic formation that produces petroleum products. The he heater cable has a proximal end at the surface and a distal end in the wellbore. The heater cable includes at least one conductor, a jacket surrounding the at least one conductor, a first capillary tube that extends to a position near the distal end of the heater cable, and a second capillary tube that extends to a position near the distal end of the heater cable. The second capillary tube is connected to the first capillary tube with a coupler near the distal end of the heater cable. The heater cable also includes a fiber optic line removably injected to a desired location within the first capillary tube.

WRITTEN DESCRIPTION

Figure 1:
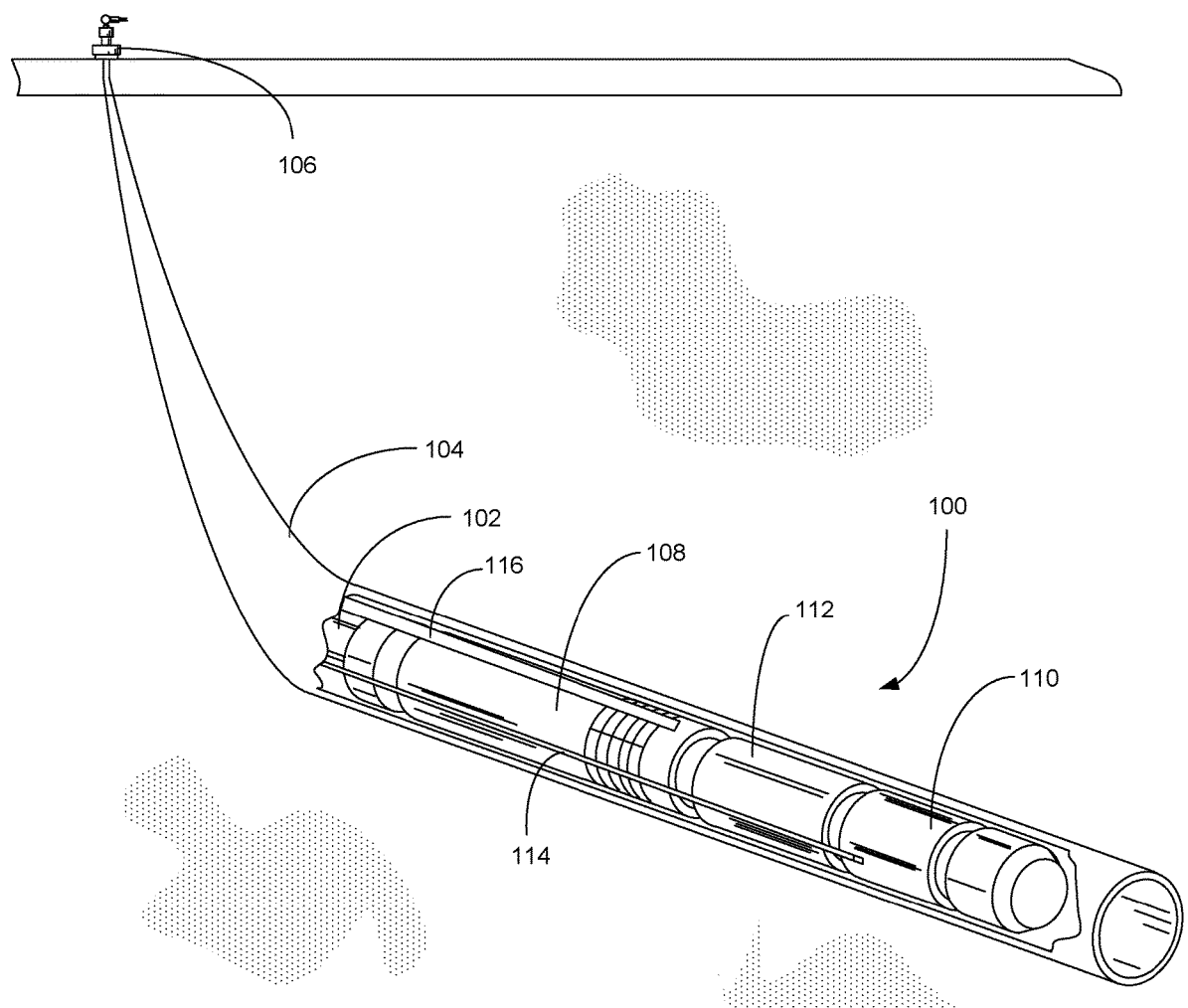
FIG. 1 is a perspective view of a downhole pumping system that includes a heater cable constructed in accordance with an exemplary embodiment.

In accordance with an exemplary embodiment, FIG. 1 shows a front perspective view of a downhole pumping system 100 attached to production tubing 102. The downhole pumping system 100 and production tubing 102 are disposed in a wellbore 104, which is drilled from the surface for the production of petroleum products. As used herein, the term "petroleum" refers broadly to all mineral hydrocarbons, such as crude oil, gas, methane hydrates and combinations of these hydrocarbons. The downhole pumping system 100 is shown in a non-vertical well. This type of well is often referred to as a "deviated" or "horizontal" well. Although the downhole pumping system 100 is depicted in a horizontal well, it will be appreciated that the downhole pumping system 100 can also be used in vertical wells. It will be further appreciated that the wellbore 104 may be inland or offshore may in each case extend miles below the surface.

The production tubing 102 connects the pumping system 100 to a wellhead 106 located on the surface. Although the pumping system 100 is primarily designed to pump petroleum products, it will be understood that the present invention can also be used to move other fluids, including water. It will also be understood that, although each of the components of the pumping system 100 are primarily disclosed in a submersible application, some or all of these components can also be used in surface pumping operations.

In the embodiment depicted in FIG. 1, the pumping system 100 includes some combination of a pump 108, a motor 110 and a seal section 112. The motor 110 is an electrical motor that receives its power from a surface-based supply through a power cable 114. The motor 110 converts the electrical energy into mechanical energy, which is transmitted to the pump 108 by one or more shafts. The pump 108 includes a plurality of centrifugal pumping stages that transfer a portion of this mechanical energy to fluids within the wellbore 104, causing the wellbore fluids to move through the production tubing 102 to the surface.

Although the pumping system 100 is illustrated as a conventional multistage centrifugal pump, it will be appreciated that in other embodiments, the pump 108 is a progressive cavity (PC) or positive displacement pump that moves wellbore fluids with one or more screws. Such progressive cavity pumps can be driven by a downhole motor or by a surface-mounted rotary motor that is connected to the downhole pump with a rotating rod. In yet other embodiments, the pumping system 100 is configured as a rod-lift system in which a beam pumping unit on the surface forces a downhole pump to reciprocate through a series of interconnected "sucker" rods. In some cases, the pumping system 100 may include gas and plunger lift systems in which the gas pressures within the wellbore 104 are strategically increased and released to remove fluids from the wellbore 104.

The pumping system 100 also includes a heater cable 116. The heater cable 116 can be connected to the production tubing 102 and may extend from the surface to the downhole components of the pumping system 100. As depicted in FIG. 1, the heater cable 116 extends to a position in the wellbore 104 adjacent the intake of the pump 108. In other applications, it may be desirable to deploy the heater cable 116 to a distance in the wellbore 104 beyond the terminal end of the pumping system 100. For example, in certain horizontal wells it may be desirable to extend the heater cable 116 on tubing that extends deep into the lateral section of the wellbore 104 adjacent the perforations to the hydrocarbon-producing formations. In yet other embodiments, the heater cable 116 is looped around the terminal end of the pumping system 100, with both ends of the heater cable 116 terminating at the surface.

Figure 2:
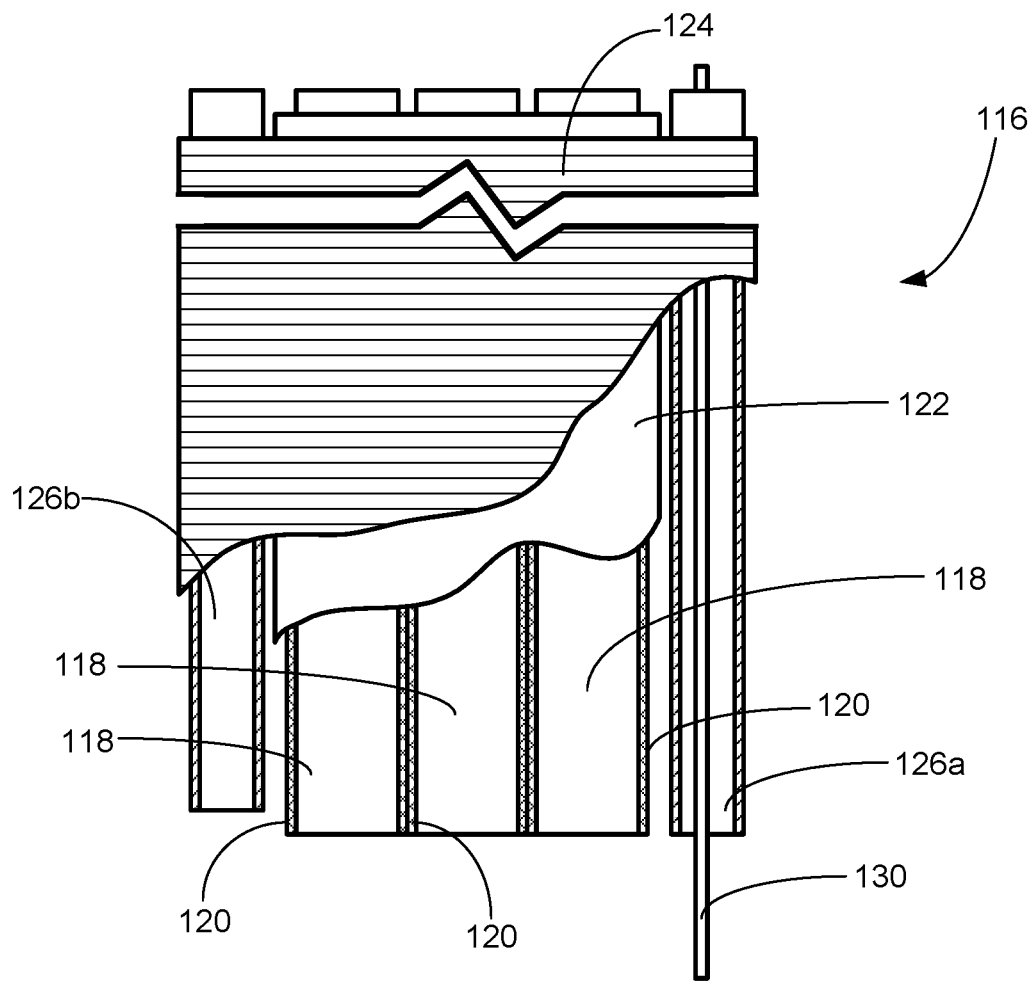
FIG. 2 is a side view of the heater cable of FIG. 1.
Figure 3:
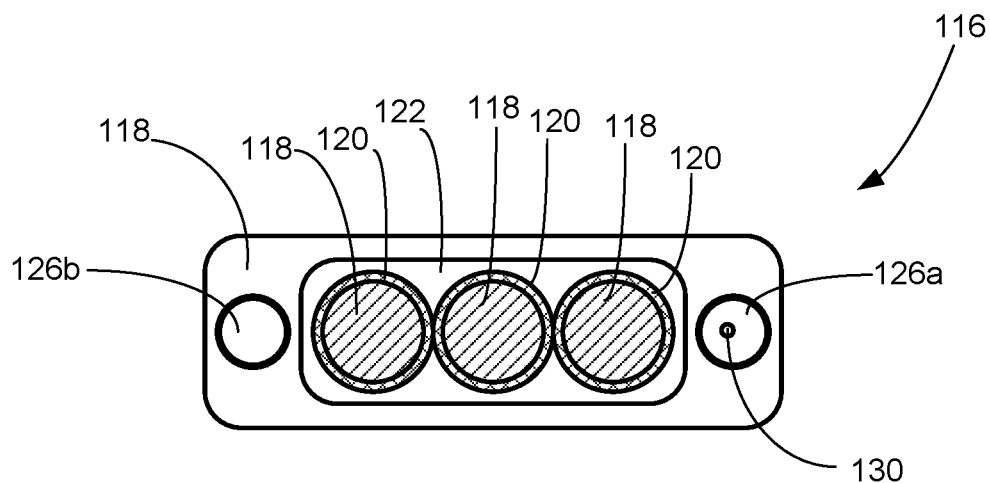
FIG. 3 is an end view of the heater cable of FIG. 2.

Referring now to FIGS. 2 and 3, shown therein are side and end views, respectively, of the heater cable 116. The heater cable 116 is a resistive element that generates heat as current flows through the one or more conductors. As depicted in FIGS. 2 and 3, the heater cable 116 includes three conductors 118 that are each protected by an insulator 120. In exemplary embodiments, the conductors 118 are manufactured from copper. The conductors 118 can include a solid core, a stranded core or a stranded exterior surrounding a solid core. The conductors 118 can also by coated with one or more layers of tin, nickel, silver, polyimide film or other suitable material. The insulator 120 provides an electrical and moisture barrier and may be manufactured from commercially available wire insulating materials, including polyimide and fluoropolymer extrusions and films.

The heater cable 116 also includes a jacket 122 and external armor 124. The jacket 122 surrounds the insulated conductors 118. The jacket 122 can be constructed from lead or lead alloys that exhibit favorable heat transfer properties while protecting the conductors 118 and limiting electrical conductivity. The external armor 124 encases the jacket 122 and provides an abrasion-resistant shield that can be configured for banding or other connection to the production tubing 102. The external armor 124 can be manufactured from galvanized steel, stainless steel, Monel or other suitable metal or composite.

Figure 4:
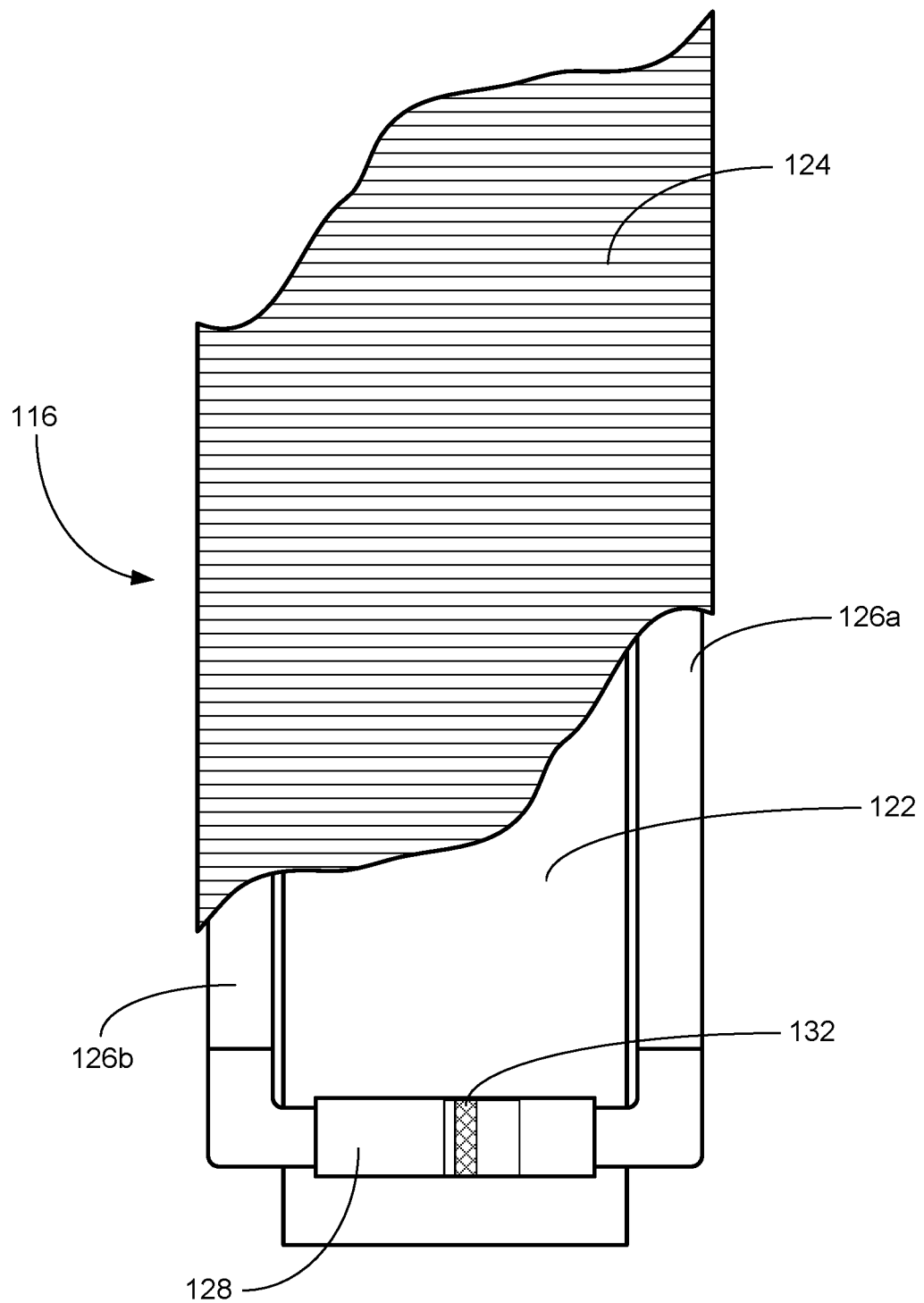
FIG. 4 is a side view of the terminal end of the heater cable of FIG. 2.

The heater cable 116 includes two or more capillary tubes 126 inside the external armor 124, but outside the jacket 122. In some embodiments, the capillary tubes 126 are positioned inside the jacket 122. Although the full range of embodiments is not so limited, the capillary tubes 126 may range in size from 0.0625 inch to 0.5 inch in inside diameter, with an inside diameter of about 0.375 inch being suitable for many installations. Larger capillary tubes 126 may be desirable for longer heater cables 116. The capillary tubes 126 can be used as hydraulic lines to carry pressurized fluid to various components within the pumping system 100. As depicted in FIG. 4, the capillary tubes 126 can be connected with a coupler 128 near the terminal end of the heater cable 116.

As illustrated in FIGS. 2 and 3, the heater cable 116 also includes a fiber optic line 130 extending through one of the capillary tubes 126. The fiber optic line 130 extends from the surface to a desired location within the heater cable 116. The fiber optic line 130 is useful for providing analysis of conditions in the wellbore 104, including through use of distributed temperature sensing (DTS) and distributed acoustic sensing (DAS) techniques.

Unlike prior art heater cables that include integrated fiber optic lines that are installed during manufacture, the heater cable 116 is configured to permit the selective injection and removal of the fiber optic line 130 in situ while the heater cable 116 is deployed in the wellbore 104. The interconnected capillary tubes 126 can be used with a working fluid to inject the fiber optic line 130 down a first capillary tube 126a while the second capillary tube 126b provides a return of the working fluid to the surface. Suitable working fluids include alcohols and other fluids that do not degrade or compromise the fiber optic line 130. To facilitate the injection of the fiber optic line 130 into the capillary tube 126, the fiber optic line 130 may include one or more weighted headers (not shown) to provide greater surface area to increase drag from the pumped working fluid. Once the fiber optic line 130 has been injected to the desired length, the working fluid can be purged with an inert gas such as nitrogen to dry the interior of the capillary tube 126a and the fiber optic line 130.

The position of the terminal end of the fiber optic line 130 within the first capillary tube 126a can be determined by measuring the length of the fiber optic line 130 as it is injected into the heater cable 116, or by using optical time domain reflectometry (OTDR). Due to the possibility of different thermal expansion properties between the fiber optic line 130 and the capillary tubes 126a it may be desirable to "overstuff" the fiber optic line 130 inside the capillary tube 126a. Depending on the materials of construction for the capillary tube 126a and the fiber optic line 130, and the temperatures within the wellbore 104, it may be advisable to inject a length of fiber optic line 130 that is 0.1% to 1.0% longer than the corresponding length of the capillary tube 126a where the fiber optic line 130 is intended to reside. In certain applications, it may be desirable to place a line stop 132 within the capillary tube 126a or the coupler 128 to control the location of the terminal end of the fiber optic line 130. The line stop 132 includes a mesh trap that allows fluid to pass with minimal impedance through the line stop 13, but blocks the fiber optic line 130.

Figure 5:
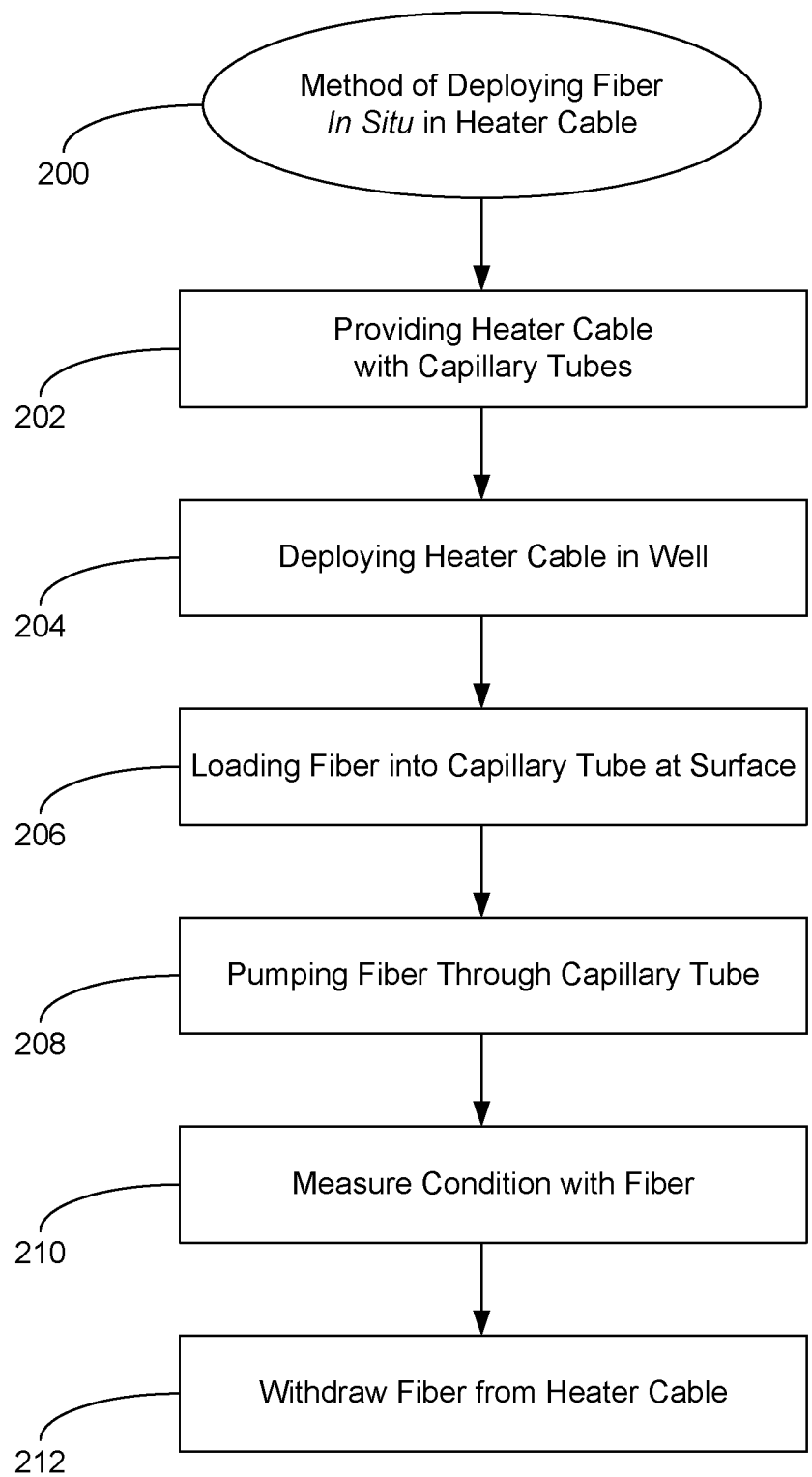
FIG. 5 is a process flow chart for a method of installing a fiber optic line within the heater cable of FIG. 6.

Turning to FIG. 5, shown therein is a process flow chart for a method 200 for deploying a fiber optic line 130 into the heater cable 116 deployed in the wellbore 104 through the wellhead 106. The method 200 begins at step 202 by providing a heater cable 116 with a first capillary tube 126a connected to a second capillary tube 126b. The method continues at step 204 by deploying the heater cable 116 into a wellbore 104. Next, at step 206, the fiber optic line 130 is loaded into the first capillary tube 126a at the surface. At step 208, the fiber optic line 130 is deployed to a desired position within the heater cable 116 by pumping a working fluid into the first capillary tube 126a such that the working fluid is returned to the surface through the second capillary tube 126b. The position of the end of the fiber optic line 130 within the heater cable 116 can be determined by measuring with a counter the length of the fiber optic line 130 that has been injected into the well.

Next, at step 210, the fiber optic line 130 is used to evaluate a condition within the wellbore 104. At step 212, the fiber optic line 130 is retrieved from the wellbore 104. The fiber optic line 130 can be retrieved from the surface by withdrawing the fiber optic line 130 through the first capillary tube 126a. Alternatively, the fiber optic line 130 can be released from the surface and pumped back to the surface through a second capillary tube 126b. In this way, the heater cable 116 is configured to permit the deployment and retrieval of the fiber optic line 130 while the heater cable 116 remains deployed in the wellbore 104. This permits the temporary installation of the fiber optic line 130 and the deployment of the fiber optic line 130 into multiple wellbores 104 without removing the heater cable 116 from the wellbore 104. Some of these steps may be omitted during the execution of variations of the method 200. For example, in many cases the heater cable 116 has already been deployed and the method can begin at step 206 by loading the fiber optic line 130 into the first capillary tube 126a.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A method for deploying a fiber optic line from a surface to a desired location in a wellbore, the method comprising the steps of:
   identifying a heater cable that includes one or more conductors and a first capillary tube, wherein the heater cable has been deployed in the wellbore;
   loading a terminal end of the fiber optic line into the first capillary tube from the surface;
   pumping a working fluid into the first capillary tube from the surface to inject the fiber optic line through a portion of the first capillary tube; and
   stopping the injection of the fiber optic line when the terminal end of the fiber optic line reaches the desired location in the wellbore.

2. The method of claim 1, wherein the step of identifying a heater cable further comprises identifying a heater cable that includes one or more conductors, a first capillary tube and a second capillary tube, wherein the heater cable has been deployed in the wellbore.

3. The method of claim 2, wherein the step of pumping a working fluid into the first capillary tube further comprises pumping the working fluid into the first capillary tube and the second capillary tube from the surface to inject the fiber optic line through a portion of the first capillary tube.

4. The method of claim 1, wherein following the step of pumping a working fluid, the method comprises an additional step of measuring the length of the fiber optic line as it is injected into the first capillary tube.

5. The method of claim 1, wherein the step of pumping a working fluid comprises pumping an alcohol fluid into the first capillary tube.

6. The method of claim 1, wherein following the stopping step the method comprises an additional step of using the fiber optic line to measure one or more environmental parameters in the wellbore.

7. The method of claim 1, wherein following the stopping step the method comprises an additional step of withdrawing the fiber optic line through the first capillary tube.

8. The method of claim 1, wherein the step of identifying a heater cable comprises identifying a heater cable that includes one or more conductors, a first capillary tube and a second capillary tube, wherein the heater cable has been deployed in the wellbore, and wherein following the stopping step the method comprises an additional step of withdrawing the fiber optic line through the second capillary tube.

9. A method for deploying a fiber optic line from a surface to a desired location in a wellbore, the method comprising the steps of:
   identifying a heater cable that has been deployed in the wellbore, wherein the heater cable includes a first capillary tube, a second capillary tube and a coupler that connects the first capillary tube to the second capillary tube near a terminal end of the heater cable;
   loading a terminal end of the fiber optic line into the first capillary tube from the surface;
   pumping a working fluid into the first capillary tube from the surface to inject the fiber optic line through a portion of the first capillary tube;
   returning the working fluid to the surface through the second capillary tube;
   measuring the length of the fiber optic line as it is injected into the first capillary tube; and
   stopping the injection of the fiber optic line when the terminal end of the fiber optic line reaches the desired location in the wellbore.

10. The method of claim 9, wherein the step of pumping a working fluid comprises pumping an alcohol fluid into the first capillary tube.

11. The method of claim 9, wherein following the stopping step the method comprises an additional step of using the fiber optic line to measure one or more environmental parameters in the wellbore.

12. The method of claim 11, wherein following the stopping step the method comprises an additional step of withdrawing the fiber optic line through the first capillary tube.

13. The method of claim 11, wherein following the stopping step the method comprises an additional step of withdrawing the fiber optic line through the second capillary tube.

14. A heater cable for use in a wellbore drilled from a surface to a geologic formation that produces petroleum products, wherein the heater cable has a proximal end at the surface and a distal end in the wellbore and wherein the heater cable comprises:
   at least one conductor;
   a jacket surrounding the at least one conductor;
   a first capillary tube that extends to a position near the distal end of the heater cable;
   a second capillary tube that extends to a position near the distal end of the heater cable, wherein the second capillary tube is connected to the first capillary tube with a coupler near the distal end of the heater cable; and a fiber optic line inside the first capillary tube, wherein the fiber optic line is removably injected to a desired location in the first capillary tube.

15. The heater cable of claim 14, wherein the heater cable comprises three conductors.

16. The heater cable of claim 14, wherein the jacket comprises lead or lead alloy.

17. The heater cable of claim 14, further comprising an external armor that surrounds the first capillary tube, the second capillary tube and the jacket.

18. The heater cable of claim 14, wherein the first and second capillary tubes each have an inside diameter of between about 0.25 inches to about 0.5 inches.

19. The heater cable of claim 18, wherein the first and second capillary tubes each have an inside diameter of about 0.375 inches.

20. The heater cable of claim 18, wherein the fiber optic line includes a header that is nominally smaller than the diameter of the first capillary tube.

\* \* \* \* \*